(No Model.) 2 Sheets—Sheet 1.

C. I. BUSH.
TIRE FOR WHEELS.

No. 373,921. Patented Nov. 29, 1887.

ATTEST.
J. Henry Kaiser
Victor J. Evans

INVENTOR.
Cory I. Bush
by Rogers & Cory
Attorney (No Model.) 2 Sheets—Sheet 2.

C. I. BUSH.
TIRE FOR WHEELS.

No. 373,921. Patented Nov. 29, 1887.

WITNESSES
J. Henry Kaiser
Victor J. Evans

INVENTOR
Cory I. Bush
by Rogers & Cory
Attorney

UNITED STATES PATENT OFFICE.

CORY I. BUSH, OF PROCTORSVILLE, OHIO.

TIRE FOR WHEELS.

SPECIFICATION forming part of Letters Patent No. 373,921, dated November 29, 1887.

Application filed October 4, 1887. Serial No. 251,474. (No model.)

*To all whom it may concern:*

Be it known that I, CORY I. BUSH, a citizen of the United States, residing at Proctorsville, in the county of Lawrence and State of Ohio, have invented certain new and useful Improvements in Tires for Vehicle-Wheels; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention consists in forming beveled shouldered depressions at proper distances apart upon the inner and outer edges or angles of tires of wheels, said depressions on one side being forward of or in rear of those on the other side, and the shoulders being directly in the radial line of the spokes, as and for the purpose hereinafter described.

Figure 1:
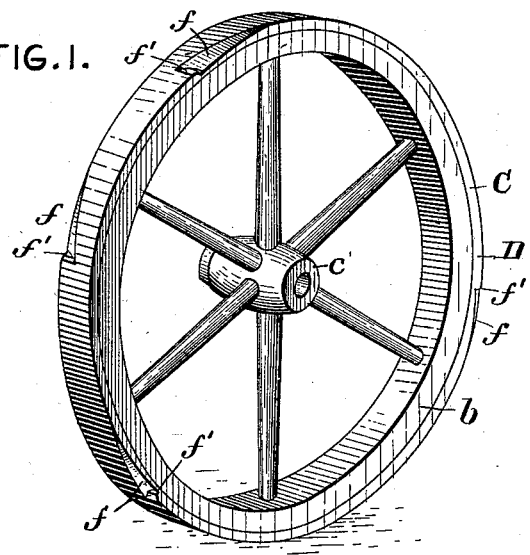
Figure 2:
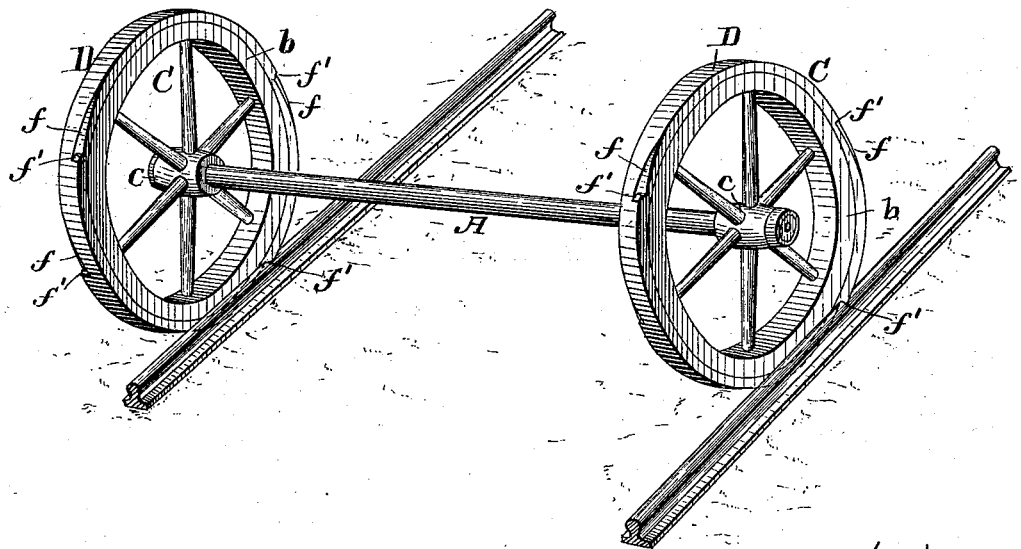
Figure 3:
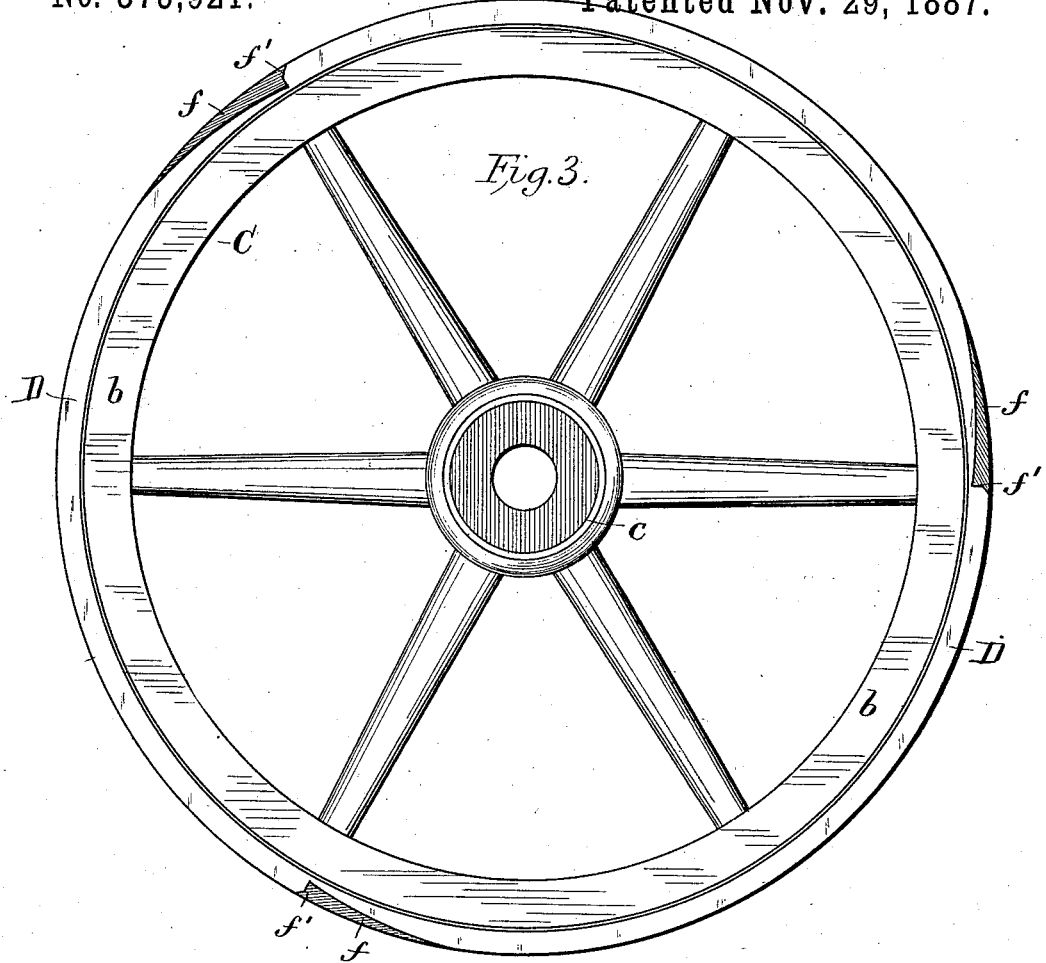
Figure 4:
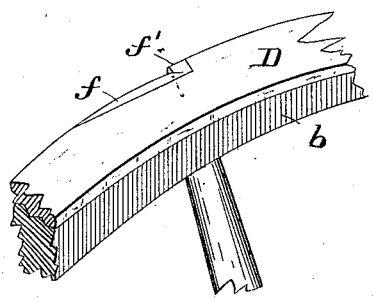

In the accompanying drawings, Figure 1 is a perspective view of a vehicle-wheel with my invention applied to it. Fig. 2 is a view of two wheels upon an axle, with my invention in the act of crossing the rails of a railroad track. Fig. 3 is a face view of a wheel with my invention, and Fig. 4 is a detail view.

In the drawings, A represents the front axle, B a tongue, and C wheels, of a wagon or other vehicle. The wheels are provided with tires D, of novel construction, and consist, as usual, of spokes *a*, fellies *b*, and hubs *c*, as shown.

For the purpose of enabling the wheels to roll over instead of sliding against and along the sides of the rails E of a track, I construct the tires D with the beveled wedge or V-shaped depressions *f* of considerable length, the slope beginning at the extreme of the angle formed by the face and periphery of the tire and gradually deepening and widening therefrom until they terminate in triangularly-shaped shoulders *f'*, which are partly vertical and partly inclined, as shown, and present a somewhat oblique bearing-surface above the strictly vertical shoulder for coming in contact with the rails of the track and biting upon the same in such a manner as to insure the lifting of the wheels in the act of turning out or into the track or when backing the vehicle, the long beveled V-shaped depressions *f* acting as conductors or guides to the wheels until the shoulders take a fair hold upon the rails and secure the purchase by which their lifting over the track is insured without the injurious wrenching and slipping as now experienced with wheels not provided with such depressions. I prefer to make the shoulder slightly oblique, as shown, in order that its contact with the rails shall not be too positive, and a ready disconnection of the shoulder from the angle of the rail be effected when the wheel shall have arrived on the top of the same, this construction also insuring a re-formation of the shoulders as the metal wears away above and beyond the same. It will be seen from the drawings that I have provided three of these depressions *f* on each side of the wheel, and that those on the inside are not opposite to those on the outside of the wheel, and thus the tire is not materially weakened, as the shoulders *f'* are formed at points where the tires and fellies are sustained by the spokes, the shoulders being directly in line with the spokes. It will also be seen that by having the depressions on the inside and outside of the wheel the same is enabled to bite upon the rails when moving either to the right or left, or when backing the vehicle.

My invention avoids the rapid destruction of vehicle-wheels which results from the sliding contact along the edges of the rails without being able to secure a hold and ride over the same, this sliding contact producing a wrenching and loosening of the spokes, and frictional wear of the fellies, as well as producing a very disagreeable sensation and noise upon the nerves of the occupants of the vehicle.

What I claim as my invention is—

1. A vehicle-wheel having its tire provided with long V-shaped depressions *f*, terminating in shoulders *f'*, which are partly vertical and partly inclined, substantially as and for the purpose described.

2. A vehicle-wheel tire provided with long

V-shaped depressions, forming an oblique angle to the face or tread of the tire, and having shoulders partly vertical and partly beveled, the bevels running in a line with the periphery of the tire, the depressions being placed alternately on the inner and outer rim of the tire and the shoulders standing on a radial line with the spokes.

In testimony whereof I affix my signature in presence of two witnesses.

CORY I. BUSH.

Witnesses:
  J. C. STODDARD,
  A. J. CORY.